United States Patent Office 3,079,229
Patented Feb. 26, 1963

3,079,229
PROCESS FOR PRODUCING TITANIUM DISULFIDE
Frederick W. Garrett, Niagara Falls, Ontario, Canada, and Samuel McCann, Niagara Falls, N.Y., assignors to Union Carbide Corporation, a corporation of New York
No Drawing. Filed Apr. 15, 1960, Ser. No. 22,415
9 Claims. (Cl. 23—134)

This invention relates to a process for the production of titanium disulfide.

It is well known that the higher sulfides of titanium possess excellent lubricating qualities which are superior to such lubricants as graphite and molybdenum disulfide for many uses. However, of the higher sulfides of titanium, the optimum lubricating properties are possessed by titanium disulfide. Titanium disulfide, although similar in appearance to graphite, has a high thermal stability, adheres better to metal surface than graphite, and is very easily ground to a fine powder.

The reaction between titanium metal and sulfur is extremely exothermic. In this reaction, it is difficult to control and limit the temperature obtained, which in a short time goes from about 650° C., the approximate temperature necessary to initiate the reaction to 2000° C. and higher. Because of this rapid increase of temperature, vaporization of a substantial portion of the sulfur occurs. Thus, it is difficult to consistently produce a stoichiometrically balanced titanium disulfide product.

It is an object of this invention to provide an improved process for producing titanium disulfide.

Other aims and advantages of this invention will be apparent from the following description and appended claims.

The process that satisfies this invention comprises introducing into a mixture of finely-divided titanium and finely-divided sulfur wherein sulfur is present in at least the stoichiometric amount necessary to produce titanium disulfide, at least one temperature-controlling compound selected from the group consisting of alkali and alkaline earth metal halides having a boiling point of at least 1100° C. The mixture is heated to a temperature of about 650° C. to initiate the titanium disulfide-forming reaction. The temperature-controlling compound becomes molten as the temperature of the mixture rises and the temperature of the mixture is controlled by the molten salt which absorbs a portion of the heat of reaction and which also holds the particles of titanium and sulfur together in the mixture allowing them sufficient time to react and at the same time preventing vaporization of the mixture. Upon completion of the reaction, the titanium disulfide is cooled, crushed, and leached with an acid inert to titanium disulfide.

In order to insure a uniform blending of the reactants, all of the reactants are preferably comminuted to a fineness of approximately 100 mesh (U.S. screen series) or smaller. Any suitable means for reducing particle sizes can be employed.

The amount of titanium and sulfur employed in the process of this invention is the stoichiometric amount necessary to produce titanium disulfide. However, it has been found preferable to employ a slight excess of sulfur over and above the stoichiometric amount required to produce titanium disulfide. This excess is preferably from about 5 percent by weight to about 20 percent by weight.

To the reaction mixture is added at least one temperature-controlling compound selected from the group consisting of alkali and alkaline earth metal halides. The alkali and alkaline earth metal halides having boiling points of at least 1100° C. are particularly suitable in the practice of the present invention and are the preferred temperature-controlling compounds. Included among these are sodium chloride, potassium chloride, calcium chloride, and magnesium chloride. The salts may be employed individually or in combination. The total amount of salt employed may vary over a wide range, e.g., between about 20 and 60 percent by weight of the total mixture of titanium, sulfur and temperature-controlling salt. However, it has been found that the most desirable results are obtained when the salt is added to the reaction mixture in amounts equalling about 30 to 50 weight percent of the total reaction mixture.

The use of the temperature-controlling compound and maintenance thereof in a molten state in the process of this invention has many advantages. Primary among these is the fact that this material, physically, partially binds the titanium and sulfur particles together. This prevents separation of the reactants before the titanium disulfide-forming reaction is completed and also inhibits vaporization of sulfur during the reaction. Another advantage derived from the process of this invention is that, during the titanium disulfide-forming reaction, the molten salt helps to prevent contamination and/or a reaction between the reactants and any gases present in the reactor. In addition, the temperature-controlling compound absorbs a portion of the heat of reaction to prevent thermal disproportionation of the titanium sulfide formed.

After the reaction mixture is uniformly blended, it is introduced into a suitable reaction vessel. Many different types of reaction vessels can be employed. A reaction vessel found particularly suitable for carrying out the process of this invention is one that can be sealed to airtightness and purged with an inert gas such as, for example, argon or helium. To insure the absence of air therefrom, a slight positive pressure of inert gas should be maintained. The reaction mixture is heated to about 650° C. after which time no further heating is necessary because of the exothermicity of the reaction.

A suitable manner of initiating the reaction is by passing electric current through a titanium coil immersed in the reaction mixture. By employing a titanium coil in this manner, a relatively short heating period of about 30 to 90 seconds is sufficient to bring a localized portion of the reactants to self-reacting temperature. Although other methods of heating are acceptable, localized heating is sufficient because of the exothermicity of the reaction.

Upon completion of the reaction, the product is cooled, removed from the reaction vessel, crushed to a suitable particle size, and leached to remove the contaminating salt. A weak acid is employed during the leaching step, i.e., an acid inert to titanium disulfide such as 12 percent acetic acid. Stronger acids, such as hydrochloric, can be employed; however, the use of such an acid also requires the use of a sequestering agent, such as gluconic acid, to maintain any dissolved titanium in solution.

The following examples will serve to better illustrate the present invention.

*Example I*

A dry, blended mixture was prepared containing 2160 grams of titanium (200 mesh by down), 3024 grams of sulfur (200 mesh by down), and 2592 grams of mixed alkali metal salt (200 mesh by down). The sulfur component corresponded to about 5 percent excess by weight above the stoichiometric requirement needed to produce titanium disulfide, and the salt was equivalent to 33 percent by weight of the total reaction mixture. The salt consisting of equal gravimetric parts of sodium chloride and potassium chloride. The blended mixture was introduced into the reactor which was sealed and purged of the existing atmosphere for several minutes with argon gas. The charge was subsequently heated by means of a titanium coil for 1½ minutes, after which time the self-propagating exothermic reaction began. After the reaction abated and the vessel was brought to room temperature, the product was removed and crushed to about 100 mesh by down particle size. The crushed product was leached with 12 percent acetic acid for approximately 30 minutes while being agitated. The product obtained analyzed 42.44 percent by weight of titanium, 53.90 percent by weight of sulfur, and 0.70 percent by weight of oxygen, this being equivalent to a sulfide of titanium having an empirical formula $TiS_{1.9}$.

*Example II*

A dry, blended mixture was prepared containing 720 grams of titanium (200 mesh by down), 1056 grams of sulfur (200 mesh by down), and 888 grams of a mixed alkali metal salt (200 mesh by down). The sulfur component corresponded to about 10 percent excess by weight above the stoichiometric requirement needed to produce titanium disulfide, and the salt was equivalent to about 33 percent by weight of the total reaction mixture. The salt consisted of equal gravimetric parts of sodium chloride and potassium chloride. The blended mixture was introduced into the reactor which was sealed and purged of the existing atmosphere for several minutes with argon gas. The charge was subsequently heated by means of a titanium coil for 1¼ minutes, after which time the self-propagating exothermic reaction began. After the reaction abated and the vessel was brought to room temperature, the product was removed and crushed to about 100 mesh by down particle size. The crushed product was leached with 12 percent acetic acid for approximately 30 minutes while being agitated. The product obtained analyzed 41.6 percent by weight of titanium, 53.8 percent by weight of sulfur, and 0.52 percent by weight of oxygen, this being equivalent to a sulfide of titanium having an empirical formula $TiS_{2.0}$.

What is claimed is:

1. In a process for the production of titanium disulfide by heating to at least about 650° C. a mixture of finely-divided titanium and finely-divided sulfur to initiate the titanium disulfide-forming reaction, the improvement which comprises providing an excess of sulfur in an amount of between about 5 and about 30 weight percent over the stoichiometric amount thereof necessary to produce titanium disulfide and adding to the mixture of titanium and sulfur, prior to the initiation of the titanium disulfide-forming reaction, at least one temperature-controlling salt selected from the group consisting of alkali and alkaline earth metal halides having a boiling point of at least 1100° C., said salt being present in an amount between about 30 and about 50 percent by weight of the total mixture of titanium, sulfur and said temperature controlling salt.

2. A process in accordance with claim 1 wherein the selected temperature-controlling salt is sodium chloride and potassium chloride in substantially equal gravimetric parts.

3. In a process for the production of titanium disulfide by heating to about 650° C. a mixture of finely-divided titanium and finely-divided sulfur to initiate the titanium disulfide-forming reaction, the improvement which comprises providing an excess of sulfur in an amount of between about 5 and about 30 weight percent over the stoichiometric amount thereof necessary to produce titanium disulfide and adding to the mixture of titanium and sulfur, prior to the initiation of the titanium disulfide-forming reaction, at least one temperature-controlling salt selected from the group consisting of alkali and alkaline earth metal halides having a boiling point of at least 1100° C., said salt being present in an amount between about 30 and about 50 percent by weight of the total mixture of titanium, sulfur and said temperature-controlling salt; upon completion of the titanium disulfide-forming reaction, cooling and crushing the titanium disulfide formed thereby and subsequently leaching the titanium disulfide with acetic acid to remove the salt therefrom.

4. A process in accordance with claim 3 wherein the selected temperature-controlling salt is sodium chloride and potassium chloride in substantially equal gravimetric parts.

5. In a process for the production of titanium disulfide by heating to at least about 650° C. a mixture of finely-divided titanium and at least the stoichiometric amount of finely-divided sulfur to initiate the titanium disulfide-forming reaction, the improvement which comprises adding to the mixture of titanium and sulfur, prior to the initiation of the titanium-disulfide forming reaction, at least one temperature-controlling salt selected from the group consisting of alkali and alkaline earth metal halides having a boiling point of at least 1100° C., the proportion of said salt in said mixture being between about 20 and 60 percent by weight of the total mixture of titanium, sulfur and said temperature-controlling salt and being such that at least substantial melting of said salt is achieved due to the heat of the titanium disulfide-forming reaction to provide a molten salt binder for the reactant materials and thereby inhibit vaporization of sulfur.

6. In a process for the production of titanium disulfide by heating to at least about 650° C. a mixture of finely-divided titanium and at least the stoichiometric amount of finely-divided sulfur to initiate the titanium disulfide-forming reaction, the improvement which comprises adding to the mixture of titanium and sulfur, prior to the initiation of the titanium-disulfide forming reaction, at least one temperature-controlling salt selected from the group consisting of alkali and alkaline earth metal halides having a boiling point of at least 1100° C., the proportion of said salt in said mixture being between about 30 and 50 percent by weight of the total mixture of titanium, sulfur and said temperature-controlling salt and being such that at least substantial melting of said salt is achieved due to the heat of the titanium disulfide-forming reaction to provide a molten salt binder for the reactant materials and thereby inhibit vaporization of sulfur.

7. In a process for the production of titanium disulfide by heating to at least about 650° C. a mixture of finely-divided titanium and at least the stoichiometric amount of finely-divided sulfur to initiate the titanium disulfide-forming reaction, the improvement which comprises adding to the mixture of titanium and sulfur, prior to the initiation of the titanium-disulfide forming reaction, at least one temperature-controlling salt selected from the group consisting of alkali and alkaline earth metal halides having a boiling point of at least 1100° C., the proportion of said salt in said mixture being between about 20 and 60 percent by weight of the total mixture of titanium, sulfur and said temperature-controlling salt and being such that at least substantial melting of said salt is achieved due to the heat of the titanium disulfide-forming reaction to provide an amount of molten salt sufficient to hold the reactant materials together until the titanium disulfide-forming reaction is substantially complete.

8. In a process for the production of titanium disulfide by heating to at least about 650° C. a mixture of finely-divided titanium and at least the stoichiometric amount of finely-divided sulfur to initiate the titanium disulfide-forming reaction, the improvement which comprises adding to the mixture of titanium and sulfur, prior to the initiation of the titanium-disulfide forming reaction, at least one temperature-controlling salt selected from the group consisting of alkali and alkaline earth metal halides having a boiling point of at least 1100° C., the proportion of said salt in said mixture being between about 30 and 50 percent by weight of the total mixture of titanium, sulfur and said temperature-controlling salt and being such that at least substantial melting of said salt is achieved due to the heat of the titanium disulfide-forming reaction to provide an amount of molten salt sufficient to hold the reactant materials together until the titanium disulfide-forming reaction is substantially complete.

9. In a process for the production of titanium disulfide by heating to at least about 650° C. a mixture of finely-divided titanium and finely-divided sulfur to initiate the titanium disulfide-forming reaction, the improvement which comprises providing at least the stoichiometric amount of sulfur necessary to produce titanium disulfide and adding to the mixture of titanium and sulfur, prior to the initiation of the titanium disulfide-forming reaction, at least one temperature-controlling salt selected from the group consisting of alkali and alkaline earth metal halides having a boiling point of at least 1100° C., said salt being present in an amount between about 20 and about 60 percent by weight of the total mixture of titanium, sulfur and said temperature-controlling salt.

References Cited in the file of this patent

UNITED STATES PATENTS 1,796,265     Freudenberg et al. _____ Mar. 10, 1931

FOREIGN PATENTS 127,245     Switzerland _____ Aug. 16, 1928

OTHER REFERENCES

Treatise on Chemistry, Roscoe and Schorlemmer, page 799, vol. II (The Metals), Macmillan and Co. (London).